United States Patent [19]

Baker

[11] Patent Number: 4,786,272
[45] Date of Patent: Nov. 22, 1988

[54] RETENTION OF BOOT ON CV JOINT ASSEMBLY

[75] Inventor: W. Howard Baker, Hartsville, Tenn.

[73] Assignee: Precision Rubber Products Corporation, Lebanan, Tenn.

[21] Appl. No.: 90,186

[22] Filed: Aug. 27, 1987

Related U.S. Application Data

[63] Continuation-in-part of Ser. No. 007,709, Jan. 28, 1987, abandoned.

[51] Int. Cl.$^4$ .............................................. F16D 3/84
[52] U.S. Cl. .......................... 464/175; 277/212 FB
[58] Field of Search ................... 74/18, 18.1, 18.2; 277/212 FB; 403/50; 464/175, 906

[56] References Cited

U.S. PATENT DOCUMENTS

| | | | |
|---|---|---|---|
| 2,761,295 | 9/1956 | Davis | 464/175 X |
| 3,292,957 | 12/1966 | Ulderup | 74/18.1 X |
| 3,404,573 | 10/1968 | Cull et al. | 403/50 |
| 3,511,061 | 5/1970 | Burckhardt | 464/175 |
| 3,579,754 | 5/1971 | Oetiker | 24/279 |
| 4,145,896 | 3/1979 | Pringle | 464/175 X |
| 4,378,858 | 4/1983 | Goft et al. | 464/175 X |
| 4,456,269 | 6/1984 | Krude et al. | 277/212 FB |
| 4,516,959 | 5/1985 | Krude | 464/175 |
| 4,558,869 | 12/1985 | Grove et al. | 277/212 FB X |
| 4,607,852 | 8/1986 | Hoh | 74/18 X |

FOREIGN PATENT DOCUMENTS 1096987  12/1967  United Kingdom ................ 464/175

Primary Examiner—Daniel P. Stodola
Attorney, Agent, or Firm—Biebel, French & Nauman

[57] ABSTRACT

A blow molded convoluted boot for use with constant velocity joints is provided with a retention convolution, the inside diameter of which is proportioned to form a direct attachment to an annular recess formed in an outer surface of the body of a CV joint for retaining the boot on the CV joint and resisting axial forces tending to pull the boot off the joint when the CV joint is operated at high offset angles.

4 Claims, 1 Drawing Sheet

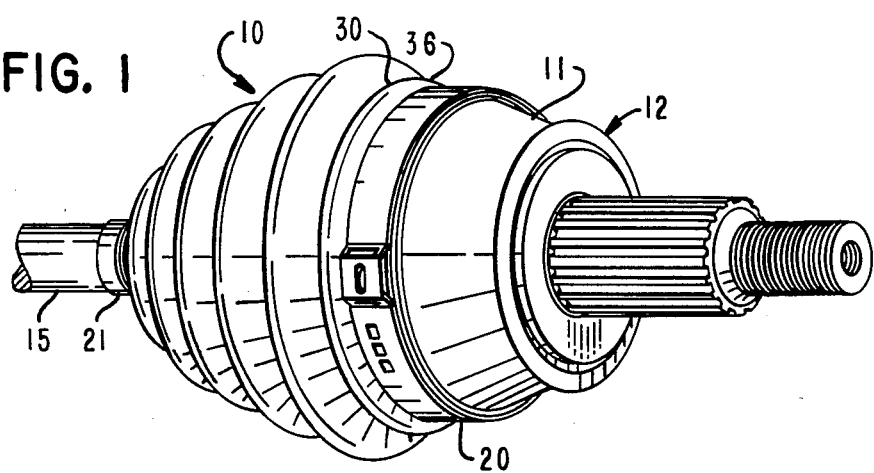
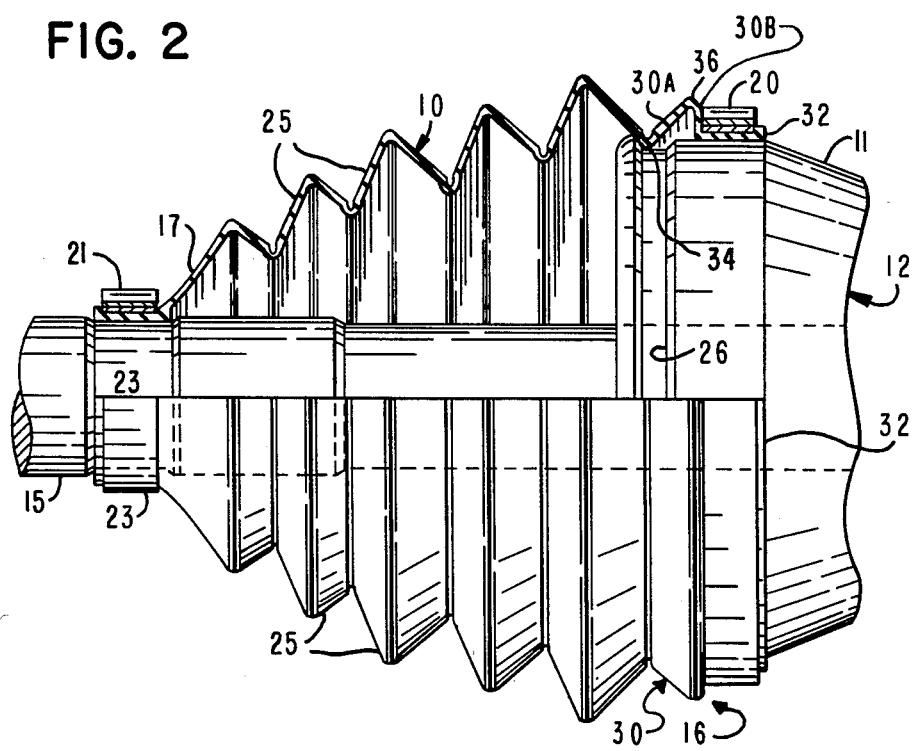

RETENTION OF BOOT ON CV JOINT ASSEMBLY

RELATED APPLICATION

This application is a continuation-in-part of application Ser. No. 007,709 filed Jan. 28, 1987, now abandoned.

BACKGROUND OF THE INVENTION

Constant velocity or CV joints, as used on automotive drive axles, such as on front wheel drive cars, are commonly enclosed within a convoluted elastomer boot. Such convoluted boots, that is, boots having a plurality of axially spaced annular convolutions, are commonly formed with a small end which is retained by a clamp on the drive shaft leading out of the joint, and a large end clamped to an annular surface of the body of the CV joint. Such boots provide a seal for the joint over the operating range of the constant velocity joint, which may include drive offset angles from between 0° up to 40° or more between the shaft and the joint body. Such boots are commonly molded of elastomeric material, such as rubber, which may have a hardness in the range of Shore 65A, for example, which permits the boot to flex with the flexing of the joint. The softness of the rubber does not result in the placement of undue stresses on the retaining clamps. Typically, the encircling clamps are of a low profile design, so as to have relatively low weight, and provide the compressive force sufficient to seal the ends of the boot to the shaft and CV body and to resist sliding or movement of the boot under the clamp when the CV joint is operated at high angles.

More recently, blow molded boots formed of more rigid thermoplastic polyester elastomers have come into use as a substitute for the rubber boot, by reason of the greater mechanical and physical strength of such elastomers over a wide variety of operating conditions, and generally by reason of the greater toughness of such elastomers and their ability to resist puncture or tearing. However, such blow molded polymers are considerably harder and stiffer than their rubber counterparts, and may, for example, have a hardness in the range of Shore 50D and a flexural modulus of 18,009 psi or more (at 22° C.). Such relatively stiffer boots impose substantially greater demands on the retaining clamps, requiring substantially greater compressive clamping forces to hold the large end of the boot in place on the body of the CV joint, without movement under the clamp, while still providing an effective seal between the boot and the body.

Typical materials from which blow-molded convoluted boots have been made are commonly referred to as thermoplastic elastomers (TPE) and include polybutylterephalate compounds (PEEBT). Typical thermoplastic elastomer materials which are used for blow-molding convoluted boots, as defined above, include du Pont "Hytrel", HTG-5612 and Monsanto's "Santoprene" thermoplastic rubber, typically grade 103-40. Such elastomers, as compared to typical rubbers, have a substantially greater tendency to deform at relatively low elongation forces, and typically have a maximum or 100% modulus which is less than half of the ultimate tensile stress.

The relatively high stiffness of such blow-molded polymers normally suggests the employment of a correspondingly heavier clamp with high clamping forces in order to hold the boot in place on the body, particularly when the boot is operated under angular offset conditions, such as on a constant velocity joint. This is especially the case at the large end of the boot, where the large inside diameter is clamped to the joint housing. In this instance, a combination of dissimilarities combine to make more difficult the clamping of such a convoluted boot, particularly at its larger end. These include (a) a greater force required to compress TPE material over its rubber counterpart, by reason of its substantial hardness as mentioned above; (b) the ability of the blow-molded TPE material to transmit axial loads onto the clamp; (c) the relatively inability of such TPE material to accept any high amount of tensile loads without permanent deformation; and (d) the tendency of the TPE blow-molded polymer material to cold flow under the clamp. For example, the compression set of du Pont "Hytrel" tested in accordance with ASTM-D395 method A, at 100° C. is 8%. However, rubber elastomers are normally tested under ASTM-D395 method B, which measures compression set under constant deflection. Such 8% compression set occurs at only about 9% strain and this would be translated as almost a 100% compression set by ASTM-D395 method B. This explains why, in service, most of the problems of sealing blow-molded TPE convoluted boots is that of the replacement of a clamp which has come loose.

SUMMARY OF THE INVENTION

This invention is directed to an improved molded polymer boot for constant velocity joints and the like of the kind described above in which an annular combined hinge and joint retaining portion is integrally formed in the boot. The retaining portion engages with the body of the CV joint, to retain the boot on the joint, and the hinge absorbs axial stresses which would tend to dislodge the boot from the joint. This permits a clamp to be used solely for forming a seal between the boot and the joint.

Preferably, such integral annular retention takes the form of an inwardly extending convolution, the inner surface of which forms a retention seat molded so as to fit within a pre-existing clamping groove formed on the joint body and an outer portion forms a flexible joint or hinge with a clamping portion. Such molded retainer, formed at an inner bend of a convolution, tends to become self-retaining, in that axial forces tending to stretch the boot and pull the boot out of position, during conditions of high angular offset, only tend to cause the boot to grip the groove with greater force. The resulting action is not unlike that of a Chinese finger trap in which the gripping force is proportional to the extracting force.

The retention convolution is formed with an inner radius received within the conventionally outwardly opening preexisting clamping groove, and is further formed with an axially extending clamping portion and the clamping portion is connected to the groove-engaging portion by a circumferential hinge section which, in cross section, is generally V-shaped to define a radially outer hinge or flexible connecting joint. The hinge portion, between the inner circumference of the retention groove and the axially extending clamping portion permits the retention portion to move, in the machined groove, without applying an excessive load on the clamp and without placing the intervening material in any substantial condition of tension. Further, the inner radius of the retention convolution can be formed by blow-molding techniques without attempting to conform or accurately fit the retention convolution into the machined groove so that it exactly fits the groove. As a result, the inner radius of the retention convolution moves back and forth within the groove when the joint is operated in an offset condition, and the intervening hinge portion, as described, isolates the clamp from having excessive loads applied thereto by reason of this movement. A boot is provided for a constant velocity joint in which the function of retention of the boot, on the joint body, is assumed by an annular convolution portion of the boot itself. This, together with the intervening hinge portion, permits an axial extension of the boot to be sealed to the CV joint body by the use of a conventional encircling clamping strap or clamping retainer.

It is accordingly an object of this invention to provide a convoluted boot for sealing a constant velocity joint or the like in which the boot is self-holding to the body of the joint.

Another object of the invention is the provision of a convoluted boot which is formed with a portion adapted to engage within an annular groove of one of the parts to which the same is attached.

A further object of the invention is the provision of a sealing boot for constant velocity joints, in which an annular portion of the boot, formed as a convolution thereon, is inter-engaged with a mating annular portion of the constant velocity joint, for capturing the boot on the body of the joint.

A still further object of the invention is the provision of a blow-molded boot, as outlined above, in which a convolution portion thereof is inter-engaged with the body on which the boot is mounted, with the inter-engagement occurring at an inside diameter of the convolution and a corresponding outside surface of the body such that axial forces tending to dislodge the boot from the body causes the convolution to grip the body with even greater force.

Another object of the invention is the provision of a blow-molded convoluted boot having a retention convolution proportioned to be received in a machined groove of a constant velocity joint, in which the retention convolution is joined to an axial clamping portion by means of an intervening hinge portion which isolates the axially-extending clamping portion from the inner convolution portion, and which permits some axial movement of the convolution portion within the groove.

These and other objects and advantages of the invention will be apparent from the following description, the accompanying drawings and the appended claims.

BRIEF DESCRIPTION OF THE DRAWINGS

FIG. 1 is a perspective view of a boot, as assembled on a constant velocity joint, and made in accordance with this invention; and FIG. 2 is a partial longitudinal section through the boot of FIG. 1 showing the manner in which the boot is mounted on the body of a constant velocity joint.

DESCRIPTION OF THE PREFERRED EMBODIMENT

Referring to the figures of the drawing, which illustrate a preferred embodiment of the invention, an injection-molded convoluted boot is illustrated generally at 10 in FIG. 1, as mounted on the body 11 of a typical constant velocity (CV) joint 12, and further as mounted on the drive shaft 15 leading from the CV joint. Typically, the larger end 16 is mounted on the CV joint while the smaller end 17 is mounted to the shaft. Encircling low profile clamps 20 and 21 respectively encircle the boot at the larger end 16 and smaller end 17 and cause the boot thereunder to grip the respective body or shaft.

The details of construction are shown in greater particularity in FIG. 2. The boot 10 is preferably formed of a polyester elastomer, although other materials as known in the art may be used, and is preferably made in accordance with the method and teachings of the copending application of Baker, Ser. No. 886,456 filed Aug. 17, 1986, and assigned to the same assignee as this invention, which copending application is incorporated herein by reference.

As shown in FIG. 2, the smaller end 17 includes an axial molded boot section 23 defining the smaller end for receiving the clamp 21. The clamps 20 and 21 are preferably of low profile, lightweight design such as shown, for example, in the Oetiker U.S. Pat. No. 3,579,754, although conventional hose-type clamps may be used.

The boot 10 is formed with a plurality of annular, axially connected, individual convolutions 25 which extend along the length of the boot, between the small end 17 and the large end 16. The convolutions 25 conventionally provide for flexing of the boot 10 while protecting the CV joint 12 from intrusion of dirt and the like.

The CV joint is customarily provided with an outwardly opening annular groove 26, forming a clamping region for the boot, which may have originally been intended to provide for the clamping of the larger end of a rubber boot therein, such as by a clamp 20. However, as explained above, due to the relative stiffness of the injection molded boot 10, the clamping force which would normally be available by a low profile clamp 20 is insufficient to retain the injection molded boot in the groove 26, particularly during high offset angles between the shaft 15 and the body 11.

The present invention provides a first or retention convolution 30 integrally molded in the boot 10 between an axial clamping extension 32 of the boot and the first adjacent conventional convolution 25. The retention convolution 30 has an inner radius at 34, the diameter of which is such as to be received snugly within the groove 26 when the boot is assembled as shown in FIG. 2. The inner radius 34, which is formed by the blow molding process, is somewhat narrower in width than the axial width of the machined groove 26, and is formed with a smoothly curved inner radius or surface.

The inner radius 34 of the retention convolution 30 is readily snapped into place within the confines of the groove 26 by a simple pressing or compressive force, which tends to collapse the bellows defined by the convolutions and tends slightly to increase the inside diameter of the curved radius 34, thus permitting ease of assembly. When assembled, the axial portion or extension 32 is proportioned to form a relatively close fit with an axial adjacent cylindrical portion of the outer surface of the body 11, to receive the clamp 20.

The retention convolution 30 is integrally joined with the axial clamping portion or extension 32 by means of a flexible hinge or joint indicated at 36. The hinge 36 is formed at an outer radius of the retention convolution 30 and joins the outwardly sloping wall 30a with the inwardly directed wall 30b which, in turn, joins the axial portion 32. The region defined by reference numeral 36 forms a flex hinge which isolates the clamping extension 32 and the associated clamp 30 from axial forces which would otherwise tend to be transmitted by the boot through the retention convolution. As noted, the inner radius of the convolution 34 has an axial dimension less than that of the groove 26 and therefore does not form a tight joint from an axial point of view. The inner radius or portion 34 will in fact move axially back and forth within the confines of the groove 26 during the times when the CV joint 12 is operating at high angulations, that is, when the axis of the shaft 15 is offset from the body 12 of the joint. As the joint rotates, the retention convolution, at the inner radius 34, will move alternately between the opposed side walls of the groove 26, and this movement is effectively isolated from the clamping extension 32 by flexing movement of the side wall 30a about the hinge portion 36.

The retention convolution 30 also is particularly effective in transmitting axial forces or stresses from the boot 10 to the body 11 of the CV joint 12 during conditions of operation at high angular offsets, thus isolating the axial extension portion 32 from forces which would tend to dislodge the boot from the body 11. In this manner, a conventional encircling clamp 20 may be torqued down sufficiently so as to form a seal between the boot, at the extension 32, and the outer surface of the body 11, without the necessity of also providing a retention or gripping force to resist axial dislodgement. In fact, forces tending to withdraw the radius portion 34 of the convolution from the groove 26 toward the small end 17 have the effect of increasing the force by which the radius 34 is seated within the groove 26, whenever the boot or any portion of the boot becomes stretched by reason of the deflection of the shaft 15 with respect to the joint 12. By the employment of a retention convolution forming an integral part of the blow-molded boot 10, a boot-joint combination is provided with preserves the integrity of the seal between the boot and the joint, over a wide variety of operating conditions.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An improved blow-molded convoluted, bellows-shaped boot for use with constant velocity joints and adapted to form a direct attachment to an annular recess formed in an outer surface of the body of a constant velocity joint, comprising:
    said boot having an annular convolution adjacent an end thereof,
    said convolution having an inside radius proportioned to be received in said recess, said boot further having a clamping extension extending axially of said convolution adapted to overlie the body of said constant velocity joint adjacent said recess and proportioned to receive an encircling clamp thereover, and integral hinge means connecting said inside radius to said clamping extension.

2. The boot of claim 1 in which in said inside radius is defined by a curved surface formed during blow molding of said boot and having an axial dimension less than that of said recess.

3. In combination, a flexible boot having a plurality of axially connected annular convolutions having at least one end thereof attached to annular body, the improvement comprising:
    a radially outwardly-opening groove in said body,
    said boot having a retention convolution telescoped over said body and having an inner radius thereof received with said groove and having a hinge portion joining an axially extending clamping portion such that axial forces applied to said boot tending to pull said boot off said body cause said retention convolution to engage said body at said groove with an increasing force, an axial movements of said radius in said groove result in flexing of said hinge portion.

4. In combination, a flexible boot having a plurality of axially connected annular convolutions having at least one end thereof attached to an annular body of a constant velocity joint, the improvement comprising:
    said body having an annular boot retention groove defined by side walls,
    a retention convolution formed as an integral part of said boot and having an inner radius thereof engaged in said groove,
    said inner radius having an axial width less than the space between said groove side walls,
    a clamping portion of said boot, and
    an integral hinge portion connecting said retention convolution to said clamping portion to isolate said clamping portion from forces tending to dislodge the same during movement of said radius in said groove.

* * * * *